Feb. 6, 1934.   L. W. KOLOZSY   1,945,814
SYNCHRONOUS FREQUENCY DETECTION SYSTEM
Filed Oct. 29, 1929   2 Sheets-Sheet 1

INVENTOR
Louis W. Kolozsy
BY
ATTORNEY

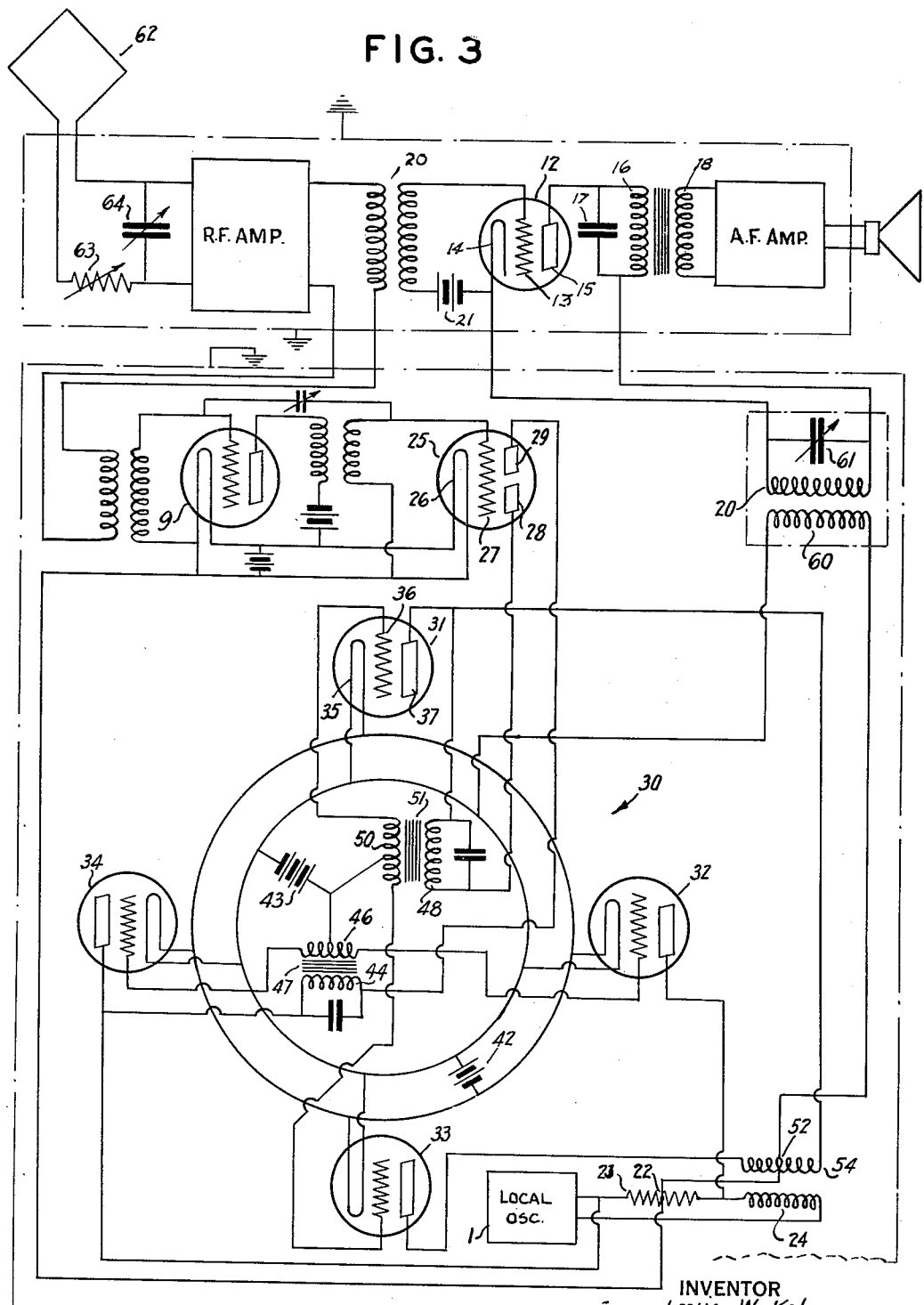

Patented Feb. 6, 1934

1,945,814

UNITED STATES PATENT OFFICE 1,945,814

SYNCHRONOUS FREQUENCY DETECTION SYSTEM

Louis W. Kolozsy, Astoria, N. Y.

Application October 29, 1929. Serial No. 403,179

20 Claims. (Cl. 250—20)

This invention relates to a system for demodulating or detecting signals, such as radio signals, comprising electrical oscillations of super-audible frequency modulated at audible frequency. At the present time such signals are practically universally detected or demodulated by the use of what is commonly known as the three electrode vacuum tube or audion.

In order to function as a detector or demodulator, such tubes are operated so that the incoming signal, which is to be detected or demodulated, is impressed on the input terminals of the tube, which has such characteristics and operating constants, that the voltage swing on the grid extends over a knee of the characteristic; that is to say, the tube operating under such conditions is not a true amplifier of incoming signals, but a distorting device so arranged that swings of voltage to one side of a theoretical voltage midpoint produce a greater effect in change of plate current than do equal swings to the other side of said midpoint.

Theory teaches, and practice verifies, that in order to so detect an incoming signal, the incoming signal must be of at least some threshhold value. If the incoming signal does not have this value, the change in plate current as the signal swings about its theoretical voltage midpoint fails to produce sufficient change in plate current to produce an indication. The result of this is that very weak signals, which are below a certain strength, cannot be detected by the ordinary system in use today.

It is an object of this invention to provide an improved system in which any signal sufficiently strong to produce a voltage sufficient to operate a linear amplifier may be detected.

It is a further object of this invention to provide a system of the class described in which a vacuum tube or audion is used as a detector, but actually operates as an amplifier; that is to say, operated on a straight line portion of its characteristic instead of on a curved portion of its characteristic.

It is a further object of the invention to provide a system in which selectivity is achieved without the use of so-called tuned radio frequency amplification, and without the use of resonant circuits, capable of being shock-excited by static and the like.

It is a further object of the invention to provide a system of the class described, in which signals click in; that is to say, as the signal is tuned in its does not gradually increase in strength until it reaches full value and then gradually decrease in strength as it is tuned out, but suddenly snaps in at its full strength and equally suddenly snaps out to zero strength as the tuning is varied, and in which even reception of the side bands is accomplished.

It is a further object of this invention to provide a system of the class described in which the selectivity is achieved by the interaction of locally generated oscillations and the incoming signal.

It is a further object of this invention to provide a system of the class described in which the incoming signal is combined with a locally generated oscillation of the same frequency.

It is a further object of this invention to provide apparatus by means of which the frequency of the locally generated oscillation is brought exactly into synchronism with the incoming signal regardless of the strength of the latter.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawings, in which Fig. 1 is a diagrammatic illustration of apparatus embodying the fundamental principles of my invention.

Fig. 3 is a diagrammatic view of apparatus according to my invention in what is for some purposes its preferred form, utilizing apparatus for fixing the frequency of the local oscillation in exact synchrony with the frequency of the incoming signal, regardless of the strength of the latter.

In its fundamental aspect, my invention contemplates the utilization of a locally generated oscillation of the same frequency as the incoming signal in such manner that the locally generated oscillation assists the incoming signal to produce an indication, but does not assist any other incoming signals to give an indication provided that the other incoming signals differ in frequency from the signal desired by 10,000 cycles (which is the condition laid down by the Federal Radio Commission for the separation between stations).

Figure 1:
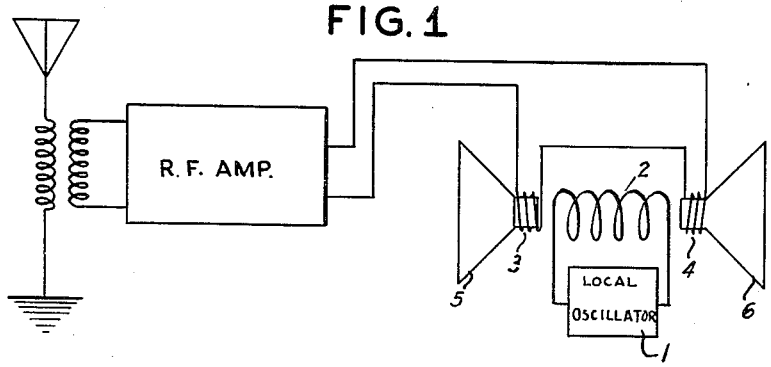

An understanding of the basic principles on which my invention operates may be had by referring to Fig. 1, in which 1 represents a local oscillator, the frequency of which is variable and which can be brought into synchrony with any incoming signals. The oscillator 1 is provided with an output coil 2, and a pair of signal coils 3 and 4 are arranged in the field of coil 2 at opposite ends thereof. The coils 3 and 4 are connected in series and are supplied with the incoming signals which in this case are assumed to be modulated radio frequency oscillations, having a particular frequency. The signal coils 3 and 4 are connected so as to drive the ordinary and well known form of cone loud speaker diaphragms 5 and 6 respectively, the coils being mounted at the apex of the cone in usual manner. However, no direct current field is provided for the signal coils.

Now it will be understood that if the frequency generated by the local oscillator is exactly the same as the frequency of the signal supplied to coils 3 and 4, the periodic reversal of direction of the current may be neglected, because the force acting on the coils will be in the same direction in any event since the direction of the current reverses not only in the coil 2, but also in the coils 3 and 4 at the same frequency. It will be understood, therefore, that a mechanical force will be generated tending to drive the cones 5 and 6, which force is dependent, among other things, upon the amplitude of the current flowing in the coils 3 and 4 and this in turn is controlled by the modulation of the signals. Therefore, it will be seen that under the conditions assumed, that is, if the local oscillator frequency corresponds to that of the incoming signal, a force is delivered against the cones 5 and 6 which is proportional to the modulation impressed upon the signal at the transmitter. Of course, the force thus impressed is strictly speaking not a steady force, but is a pulsating force, pulsating at radio frequency. However, since the inertia of the cone and its loading prevent the cone vibrating at anything above audible frequency, it will be seen that the cone and its associated apparatus act as a mechanical integrating device whereby the cone vibrates at audio frequency in accordance with the modulations impressed upon the signal at the transmitting station.

If another signal is being fed into the coils 3 and 4, which differs from the locally generated oscillation by more than 10,000 cycles, the field of the local oscillator coil 2 and of the signal coils 3 and 4 will no longer always produce a force in the same direction, but this force will reverse itself periodically at least 10,000 times per second, the reversals taking place so fast that the cone cannot follow them and consequently remains stationary.

Signals which differ from the local oscillation by less than 10,000 cycles in the arrangement shown in Fig. 1 might possibly be heard as a beat, depending upon the constants of the cone and other factors. However, in accordance with my invention, I provide arrangements whereby as soon as the local oscillator frequency reaches a predetermined limit, which in practice we may set as 5,000 cycles, different from the incoming signal desired, the local oscillator is either immediately pulled exactly into step with the incoming signal or an additional oscillation, the frequency of which is sufficient to bring the local oscillator frequency up to the signal frequency is added or subtracted, so that as the tuning of the local oscillator is varied in tuning in a signal, when it approaches such a frequency that the signal might be heard as a beat note, it is immediately pulled into step with the signal or has another oscillation combined with it as already described in such manner as to demodulate the incoming signal.

Figure 2:
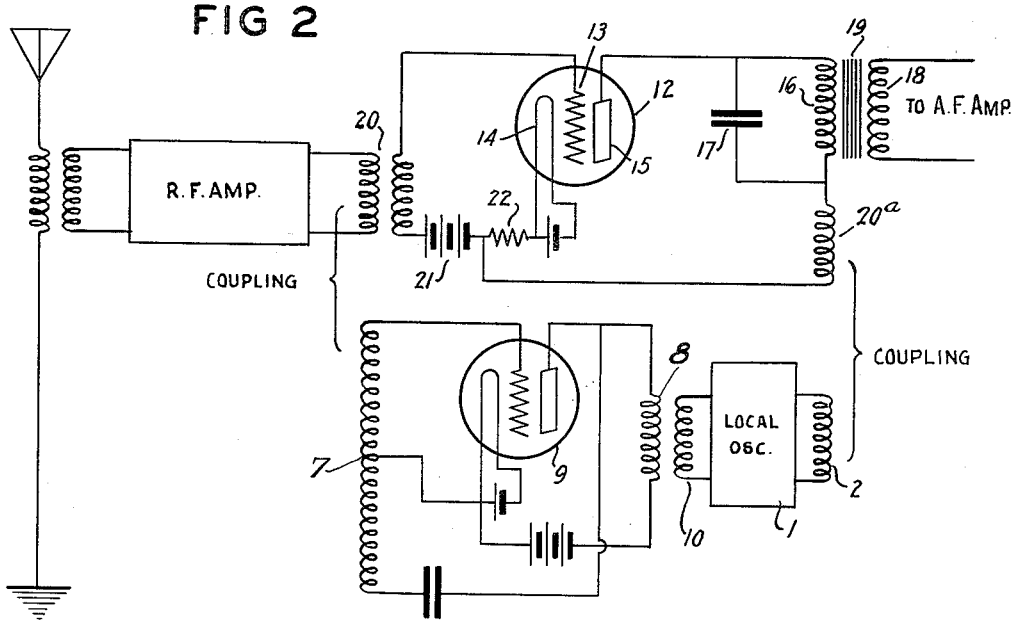
Fig. 2 is a diagram of apparatus embodying vacuum tubes, but operating according to the principles of the apparatus shown in Fig. 1.

It should be borne in mind that the apparatus shown in Fig. 1 functions as a mechanical integrator of radio frequency mechanical impulse, while the apparatus shown in Fig. 2 functions as an electrical integrator of electrical impulse, and while at the present time the electrical integration of electrical impulses is preferred, both systems are within the spirit of my invention.

Referring now more particularly to Fig. 2: 1 indicates, as before, a local oscillator having an output coil 2. In this instance the local oscillator is provided with an input coil 10 and a neutralized or blocking tube 9 having an input coil 7 and an output coil 8 is interposed between the input coil 10 of the local oscillator 1 and the output coil of the radio frequency amplifier for the purpose of permitting signals to travel from coil 10 to the input of the local oscillator 1, while preventing any reverse travel of the local oscillation from the oscillator 1 to the input of amplifier 12. Since the construction and operation of neutralized tube systems is well known in the art, it is not described in detail.

The input coil of the blocking tube 9 may be coupled to the coil 20 in any suitable manner as for instance by placing the said coils so that their fields are interlinked, and similarly the output coil 2 of the local oscillator may be coupled to coil 20a.

An amplifier tube 12 is provided which may be and preferably is the usual three electrode amplifier tube, having an anode 15, a cathode 14, and a control electrode or grid 13. The plate or output circuit of the tube 12 comprises the primary winding 16 of an audio frequency transformer, which is shunted by condenser 17, and a secondary winding 18 is inductively interlinked with the primary winding 16 by means of a core 19 of magnetic material. The construction of the transformer and its condenser is essentially the same as those well known in the art and no further description is believed to be necessary except to say that if desired the transformer may sharply cut off at 5,000 cycles or slightly thereabove if desired.

The secondary winding 18 may supply the input of any suitable audio amplifying system and indicator, and since the same forms per se no part of this invention, it is not shown.

Any suitable source may be provided for heating the cathode 14 of the tube 12 and the other tubes and if desired these tubes may be of the so-called heater type having a cathode which is energized by a separate heater and the heater may if desired be energized by alternating current, or other arrangements may be used for energizing the cathodes as will be readily understood by those skilled in the art. A suitable biasing battery 21 is provided for the purpose of maintaining the grid 13 negative with respect to the cathode 14, and a resistance 22 may be provided in the input circuit to cause the tube 12 to operate as a linear amplifier. Incoming signals, either directly from the antenna or after having been amplified to the desired degree are fed into the input circuit of the tube 12.

It will be noted that contrary to the usual practice no battery or source of steady potential is provided in the plate circuit. It will be observed, however, that the local oscillations generated by the oscillator 1 are fed into the plate circuit of the tube 12 by means of the oscillator output coil 2 coupled with the coil 20a in the plate circuit of tube 12. The result of this construction, as will be readily understood by those skilled in the art, is to influence the action of tube 12 in such a way that current flows in the output circuit only when the anode 15 is maintained positive with respect to the cathode; in other words, during only one-half of the cycle. Now, if at the time the anode 15 is positive an incoming signal is impressed upon the input circuit of the tube 12, this signal will be repeated in amplified form in the output circuit. During the next half of the cycle, when the anode 15 is negative with respect to the cathode, the incoming signal will not be repeated in the output circuit, in which no current is flowing. The result of this is that if an incoming signal, which has the same frequency as the frequency of the local oscillation impressed upon the plate, is impressed on the grid, there will be repeated in the output circuit a series of radio frequency pulses, the amplitude of which is proportional to the signal impressed upon the grid. The action of the transformer and condenser 17 serves as will be understood to integrate these radio frequency impulses and to produce a current of audible frequency corresponding to the amplitude of these pulses, which in turn corresponds to the modulation of the signal.

While this is true for incoming signals which have the same frequency as the oscillations generated by the local oscillator, it will not be true of signals differing therefrom by more than the cut off frequency of the transformer and condenser 17, and such signals will not be heard in the output circuit.

If a relatively powerful radio frequency amplifier is provided ahead of the tube 12, even relatively weak incoming signals will be sufficiently strong to pull the local oscillator into synchronism with the desired signal, after it has been tuned approximately to signal frequency. At the same time the blocking tube prevents the local oscillations being fed into the input of tube 12 and causing undesirable effects.

In the arrangement of Fig. 2 the provision of coupling between the output of the radio frequency amplifier and the input of the local oscillator serves the purpose of pulling the local oscillator into step with the incoming signal as soon as the local oscillator frequency reaches a predetermined frequency difference on one side or the other of the incoming signal frequency. However, in order for the incoming signal to pull the local oscillator into step with it, the incoming signal must have some value of signal strength and it is quite possible under certain conditions that the incoming signal would not have sufficient strength to pull the local oscillator into step. Therefore I have provided an arrangement whereby regardless of the strength of the incoming signal or local oscillation is produced, the frequency of which is exactly equal to the frequency of the incoming signal.

It is clear that this arrangement is capable of use not only in the present system but in many other systems in which a locally generated oscillation is desired which shall have a frequency exactly equal to some other oscillation, for example in the so-called zero beat heterodyne. According to the present invention this locally generated oscillation of predetermined frequency is obtained by combining the oscillation generated by the local oscillator with another oscillation produced in a manner to be afterward described and which is just equal to the frequency required to be added to or subtracted from the local oscillation to bring its frequency to the value desired. For example, if the local oscillator is generating a frequency of one million, and the incoming signal is one million one thousand, there is produced a local oscillation of one thousand cycles which in the present case is added to the local oscillation thereby producing a local oscillation of one million one thousand frequency, which is exactly equal to the incoming signal frequency. If, on the other hand, the incoming signal frequency is one million cycles, and the local oscillation frequency one million one thousand cycles, then the locally generated oscillation of one thousand cycles is subtracted from the frequency of the local oscillator and the local oscillation frequency of one million one thousand is brought to the signal frequency of one million. An advantage of my invention is that the addition or subtraction necessary in bringing the frequency to the value desired is carried out automatically by the apparatus and requires no operation by the operator other than an approximate tuning of the local oscillator.

In its fundamentals the invention contemplates the combination of the locally generated oscillation and the signal frequency in such a manner as to produce a beat note which, as is understood, will be equal to the difference between the local oscillation and incoming signal oscillation frequency. In accordance with my invention, however, I provide an arrangement which produces from the interaction of these two frequencies a local oscillation of polyphase current. In the preferred arrangement the beat note is produced as two-phase current, the phases differing from each other by ninety degrees. For example, in the case already discussed where the local oscillation has a frequency of one million and the incoming signal a frequency of one million one thousand, there would be produced according to my invention a two-phase current having a frequency of one thousand cycles. Now it is known that a rotating field may always be produced by means of polyphase currents, also a rotating voltage vector or current vector may be produced from such currents. If one connects two coils together at their midpoint and impresses on the two coils respectively the current of the two phases, the voltage between the midpoint and ends of the coils may be represented by a rotating voltage vector having the frequency of the beat note. Similarly it will be understood if one provides such coils so that their fields occupy the same relation to each other as previously were occupied by the voltages then a rotating magnetic field is obtained having a frequency equal to the beat note. If one produces a rotating magnetic field having the frequency of the local oscillations, for example, one million cycles, and one rotates therein a coil at an electrical speed equal to the difference between the local oscillation and the incoming signal an electromotive force will be generated in the coil as it rotates which will be equal to the sum of the local oscillation and the electrical frequency of rotation or equal to the difference of these two frequencies, depending on which way the coil is rotated. It will be understood that if it is rotated against the rotational direction of the field in which it is operating the frequency will be greater than if it is rotated in the same direction as the field in which it is operated.

It will be understood that this principle may be incorporated in a mechanical device to produce current of exactly the frequency desired. For example, the local oscillator frequency is divided into currents ninety degrees out of phase as in the case of two phase current by tapping off voltages across resistances and inductances, for example, and these voltages are introduced into coils in the well-known manner to provide a rotating magnetic field. A local generator coil is arranged to be rotated in the said rotating field and is arranged to be driven by a synchronous motor, the current supplied to which corresponds in frequency to the difference between the local oscillator and the incoming signal frequency. If the synchronous motor driving the generator coil is thus operated by currents corresponding to the difference between the locally generated oscillation and the incoming signal frequency, the generator coil rotating in the magnetic field will be driven at all times at just the proper speed to induce in it as a result of its own rotation and the rotation of the magnetic field in which it moves, an oscillation of exactly the frequency of the incoming signal and resulting from the two frequency components, (1) the locally generated oscillation which is different in frequency from the incoming signal and (2) an oscillation whose frequency equals the difference in frequency between the local oscillation and the incoming signal. While such an arrangement as just described may be used if desired, it is preferable to avoid mechanically moving parts and to produce the result by the use of thermionic relays, and it will now be described how this may be done.

Referring now more particularly to Fig. 3, the same reference characters indicate the same parts as in the previous figure. 62 designates an antenna of the closed or loop type feeding the radio frequency amplifier. In series with the loop 62 there may be provided variable resistance 63 as well as variable condenser 64 in shunt thereto. The output of the radio frequency amplifier is supplied to the input circuit of amplifier tube 12 which acts as a demodulating tube in a manner previously described. The output circuit of the amplifier tube 12 in Fig. 2 comprises coil 20 which in this instance is shown as shunted by variable tuning condenser 61. Coil 20 is supplied with radio frequency oscillations through its coupling with coil 60 in which there are flowing oscillations of exactly the incoming signal frequency. The frequency of the oscillations flowing in coil 60 is controlled by associated apparatus which will be described later.

The output of the radio frequency amplifier is fed also to the input of a neutralized repeater or blocking tube 9 which in turn feeds the input circuit of a special tube 25. This tube comprises a cathode 26 of any desired construction, a control electrode or grid 27 and a pair of anodes 28 and 29. An alternating plate voltage is applied to the anodes 28 and 29, having a frequency fixed by the frequency of the local oscillator. The voltages applied to the anodes 28 and 29 are ninety degrees out of phase and are obtained from the local oscillator as will be described.

The local oscillator contains in its output circuit a resistance 23 in series with inductance 24. It will be understood that the voltage across the resistance 23 is in phase with the current therein whereas the voltage across the inductance coil 24 leads the current therein. The voltages derived from the resistance 23 and the coil 24 are, therefore, ninety degrees out of phase and are suitable for impressing upon the anodes 28 and 29 which may be done as follows.

The midpoint 22 of resistance 23 may be connected to the cathode 26 of the tube 25 and one terminal of resistance 23 is connected through coil 44 to anode 29 thereby impressing upon the anode 29 the voltage existing across the left hand section of resistance 21. Anode 28 on the other hand is connected through coil 48 and to one terminal of coil 54 coupled to coil 24. The midpoint 52 of coil 54 is connected to the midpoint 22 of resistance 23. It will therefore be understood that the plate voltage supplied to the anodes 28 and 29 respectively is ninety degrees out of phase and by proper choice of the resistance 21 and of the coils 24 and 54 and of the coupling therebetween the two plate voltages may be made to have the same amplitude and to differ merely in phase.

It will be apparent that when the local oscillator frequency differs from the incoming signal frequency impressed upon the input of tube 25, there will be produced in either of the anode circuits a local oscillation equal to the difference between the incoming and locally generated frequencies. If these differ by 1,000 cycles there will be produced in the two anode circuits a beat frequency of 1,000 cycles, the currents being ninety degrees out of phase in each anode circuit.

It will therefore be seen that coils 48 and 44 are traversed by currents having the same frequencies (equal to the difference between the local oscillation and the incoming signal frequency) and that these currents are ninety degrees out of phase. These currents produce corresponding voltages in their corresponding transformer secondaries, that is to say, a voltage is induced in coil 46 which is ninety degrees out of phase with the voltage induced in coil 50, the coils 46 and 50 being inductively coupled to coils 44 and 48 through the medium of cores 47 and 51 of magnetic material interlinking the coils.

It will now be understood that the midpoint of coils 50 and 46 may be connected together and that the voltage existing between the midpoint and the end points of said coils is capable of representation as a rotating voltage vector. Similarly the voltage existing between the midpoints 22 and the ends of resistance 21 and coil 24, or coil 54, may likewise be represented as a rotating vector and it will be understood that by reversing any of the coils with respect to polarity the direction of rotation of the vector is reversed.

Indicated diagrammatically by 30 in Fig. 3 I have shown an arrangement for combining the locally generated two-phase beat note with the locally generated oscillator voltage of two phases in such a manner as to produce a single phase current of exactly the incoming signal frequency. This arrangement comprises the four thermionic vacuum tubes 31, 32, 33 and 34. Each tube may be of conventional construction and design, comprising a cathode 35, an anode 37, and a control electrode 36. The cathodes of all said tubes are connected together for operation by a single source of current such as battery 42. The input circuit of tubes 31 and 33 is connected to respond to the voltage across one half of coil 50, one terminal of coil 50 being connected to the control electrodes 36 of tube 31 while the opposite end of coil 50 is connected to the control electrode of tube 33. The midpoint of coils 46 and 50 is connected to the common cathode circuit through a suitable biasing battery 43 which maintains the grid sufficiently negative so that only a very small current flows in the plate circuit of the tubes when the voltage impressed upon the grids is zero.

In a manner similar to that already described the opposite terminals of coil 46 are connected to the control electrodes of tubes 34 and 32. The anodes of tubes 31 and 33 are connected to opposite terminals of coil 54 while the anodes of tubes 32 and 34 are connected to opposite terminals of resistance 21 from which it will be seen that the plate voltages of opposite tubes are 180 degrees out of phase while those of adjacent tubes are 90 degrees out of phase.

The output coil 60 is connected between the common cathode circuit and the common point of the anode circuit at 52. Now it will be apparent that starting with any particular tube, for example, tube 31, and passing progressively to tubes 32, 33, 33 and 34 and back to 31 the anode of tube 31 will be positive and the anode of tube 33 is negative with respect to the filament and at the same time the anodes of tubes 32 and 34 are at zero potential. An instant later the anode of tube 32 will be positive, that of tube 34 negative, with respect to the filament and those of 31 and 33 zero, that is to say that the plate current which flows due to the difference in potential between cathode and anode in any tube may be considered to rotate clockwise or counter clockwise, as the case may be, in accordance with the direction of rotation of the voltage vector represented by the voltage between the common midpoint 52 and the terminal of coil 54 on resistance 23.

Now it will be understood that by reversing either this coil or resistance with respect to its connection in the circuit the direction of rotation of this voltage vector will be reversed and what has been said with reference to the anodes of the respective tubes is also true of the control electrodes. In any case, the result of tuning the local oscillator 1 to a frequency slightly different from that of the incoming signal will be to impress upon the grid of tubes 31, 32, 33 and 34 a voltage having a frequency equal to the difference between the local oscillation and the incoming signal frequency, and which rotates in one direction or the other dependent upon the poling of the various transformers. At the same time that the rotating voltage is applied to the grids a rotating voltage is also applied to the plates which is equal to the frequency of the local oscillator and which also rotates in one direction or the other. Now it is desired to choose the directions of rotation in such a manner that if the local oscillator frequency is smaller than that of the incoming signal the output of the arrangement 30 is the sum of the local oscillator frequency and the beat frequency, whereas if the local oscillation frequency is greater than that of the incoming signal, the output of the device 30 is the difference between the local oscillator frequency and the beat frequency and this is best achieved by trial. It is to be pointed out, however, that once the arrangement is correctly poled, it automatically takes care of changes in the local oscillator frequency; for example, if the incoming signal is 50 cycles more than the local oscillator then the beat frequency and the local oscillator frequency will be added. On the other hand if the local oscillator then be tuned to a frequency 50 cycles greater than the incoming signal, the phases of the beat current are interchanged in such a manner that the direction of the grid voltage vector reverses and the beat frequency is subtracted from the local oscillator frequency.

It will be seen therefore that the combining device 30 may be regarded in its action as a supplementary electric generator, generating in any event exactly the frequency required necessary to combine with the local oscillator to produce exactly the incoming signal frequency. In the arrangement shown in Fig. 3 it is preferable to provide grounded shields around the apparatus as indicated by the dot and dash lines.

Figure 4:
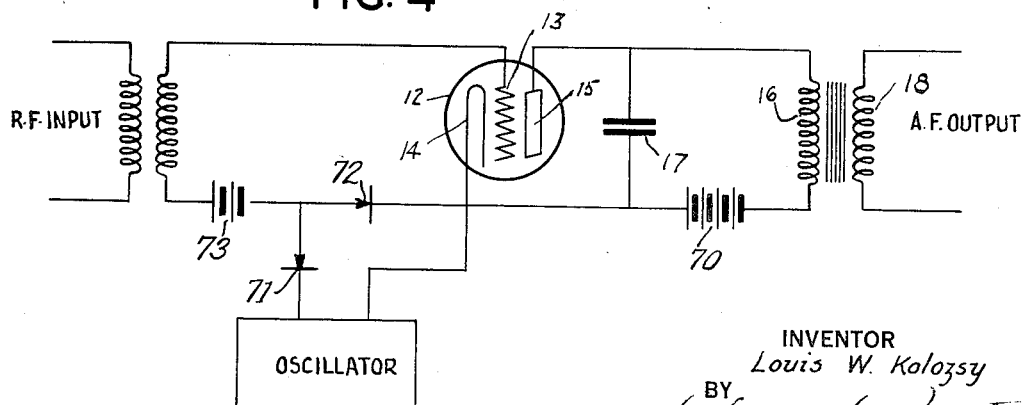
Fig. 4 is a diagrammatic view of a modification in which the locally generated oscillation is fed into the input circuit of the amplifier tube which operates for the purpose of demodulating.

Referring now more particularly to Fig. 4 I have shown another modification of the fundamental system of my invention. In this case the local oscillations generated by oscillator 1, are introduced not into the plate circuit but directly into the grid circuit of the tube 12 while the plate circuit is supplied by a suitable direct current source such as a battery 70. In the present arrangement the local oscillator serves merely to bias the grid of the tube 12 to such a point that during one-half of the local oscillator cycle the tube does not pass current, while in the other half of the local oscillator cycle it does. A pair of rectifiers 71 and 72, such as crystals, is provided connected in opposite directions so as to prevent the flow of any current from the local oscillator. The voltage existing across rectifier 72, it will be noted, is effective between the cathode 14 and grid 13 of tube 12, whereas the voltage across rectifier 71 is not. By proper choice of the constants of the various elements of this circuit, such as the voltage of battery 73 with reference to the voltage of plate battery 70 and that developed across rectifier 72, it results that, the operation of this arrangement is the same in principle as that of Fig. 2, the tube being rendered inoperative during half of the cycle of the incoming signal, and the radio frequency pulses being integrated through the action of the audio frequency transformer comprising windings 16 and 18, and condenser 17.

While I have shown tubes 31, 32, 33 and 34 as separate tubes of conventional construction, it will be understood that they may be embodied in a single evacuated vessel having a common anode, and also, tube 25 may be made as two separate tubes each of conventional construction, if desired, the circuit connections being essentially the same in either case.

While I have shown and described certain preferred embodiments of my invention, it will be understood that modifications and changes may be made without departing from the spirit and scope of my invention, as will be understood by those skilled in the art.

I claim:

1. The method of demodulating signals of super-audible frequency modulated at lower frequencies which comprises impressing the signal to be demodulated upon the input circuit of a thermionic relay arranged to operate with a rectilinear relation between input voltage and output current and rendering said relay inoperative for a portion only of each cycle of the incoming signal.

2. The method of demodulating signals of super-audible frequency modulated at lower frequencies which comprises impressing the signals to be demodulated upon the input circuit of a thermionic relay arranged to operate as a rectilinear amplifier and impressing an alternating current of the same frequency as that of the signal to be demodulated upon the output circuit of said relay.

3. The method of demodulating signals of super-audible frequency modulated at audible frequency which comprises impressing the signals to be demodulated upon the input circuit of a thermionic relay having an anode, a cathode and a control electrode, and arranged to operate as a rectilinear amplifier and varying in sign, the potential difference between said anode and cathode in synchronism with the incoming signal.

4. The method of demodulating signals of super-audible frequency modulated at lower frequency which comprises impressing the signals to be demodulated between the cathode and control electrode of a thermionic relay comprising a cathode, control electrode and an anode, and arranged to operate as a rectilinear amplifier and impressing between said cathode and one of said other electrodes an electro motive force varying in synchronism with the signals to be demodulated, and of such value as to substantially prevent the flow of space current in said relay during a part of every cycle.

5. The method of demodulating signals of super-audible frequency modulated at lower frequency which comprises impressing the signals to be demodulated upon the input circuit of a thermionic amplifier having a rectilinear operating characteristic and energizing the output circuit of said amplifier from a voltage alternating in synchronism with the voltage of the incoming signal.

6. The method of demodulating super-audible frequency signals previously modulated in accordance with speech or music to be transmitted, which comprises impressing said signals upon the input circuit of a vacuum tube amplifier having a rectilinear operating characteristic, and impressing upon the output circuit of said amplifier a voltage alternating in synchronism with the incoming signal.

7. The method of demodulating signals of super-audible frequency previously modulated in accordance with speech or music to be transmitted, which comprises impressing said signals upon the input circuit of a vacuum tube amplifier having a rectilinear operating characteristic, generating a series of local oscillations in synchronism with the incoming signal, and energizing the output circuit of said amplifier from said local oscillations.

8. The method of selectively demodulating one of a series of incoming signals previously modulated in accordance with speech or music, which comprises impressing signals including the signals to be demodulated on the input circuit of a thermionic amplifier having a rectilinear amplifying operating characteristic and periodically rendering said amplifier inoperative at least once during a part of each cycle of the signal desired to be demodulated.

9. The method of demodulating signals of super-audible frequency modulated at lower frequency which comprises producing locally generated oscillations having approximately the frequency of the incoming signals, producing by interaction of said incoming signal and said locally generated oscillation, a second local oscillation, having a frequency equal to the difference between said first local oscillation and said incoming signal, combining said second local oscillation frequency with said first local oscillation to produce a third local oscillation having exactly the frequency of the incoming signal, and impressing said third local oscillation upon a thermionic relay upon which is impressed said incoming signal oscillation.

10. The method of demodulating signals of super-audible frequency modulated at lower frequency which comprises generating local oscillations of approximately the frequency of the incoming signals, combining said incoming signals and said locally generated oscillations to produce oscillations of beat frequency, combining said oscillations of beat frequency, and said locally generated oscillations to produce local oscillations of exactly signal frequency, and combining said last-named oscillations with the incoming signal.

11. The method of demodulating signals of super-audible frequency modulated at lower frequencies which comprises generating local oscillations having approximately the frequency of the incoming signals to be demodulated, combining said locally generated oscillations and said incoming signals to produce beat frequency oscillations of more than one phase, combining said beat frequency oscillations of more than one phase with locally generated oscillations of approximately signal frequency, to produce oscillations of exactly signal frequency and combining said last-named oscillations with incoming signals.

12. The method of demodulating super-audible frequencies modulated at lower frequencies which comprises generating local oscillations having approximately the frequency of the signals to be demodulated, combining said locally generated oscillations and the signal to be demodulated to produce polyphase beat frequency currents, combining said polyphase beat frequency currents with polyphase current of said locally generated oscillations frequency to produce single phase currents having exactly signal frequency, and causing said last mentioned oscillation to interact with the signals to be demodulated.

13. A signal receiving system comprising in combination a thermionic amplifier arranged to operate on the rectilinear portion of its characteristic, means for impressing signals to be demodulated upon the input circuit of said amplifier and means for energizing the output circuit of said amplifier by a local oscillation, the frequency of which is controllable to maintain synchronism with the signals to be demodulated.

14. A signal receiving system comprising in combination a thermionic amplifier arranged to operate on the rectilinear portion of its characteristic, means for impressing signals to be demodulated upon the input circuit of said amplifier and means for impressing between the cathode and anode of said amplifier a local oscillation, the frequency of which is controllable, said means impressing the only potential difference existing between said cathode and said anode.

15. A receiving system comprising in combination a thermionic amplifier, arranged to operate as a rectilinear amplifier means for impressing signals to be demodulated on the input circuit of said amplifier, means for periodically rendering said amplifier inoperative, at least once during each cycle of the desired signal, and means for varying the frequency of said last mentioned means.

16. A signal receiving system comprising in combination a thermionic amplifier having a cathode, an anode, and a control electrode, arranged to operate as a rectilinear amplifier means for impressing signals to be demodulated between said cathode and said control electrode and means for impressing between said cathode and one of said other electrodes a fluctuating electromotive force of controllable frequency and of a magnitude sufficient to render said amplifier inoperative at least once during each cycle of said electromotive force.

17. A signal receiving system comprising in combination a thermionic amplifier arranged to operate as a rectilinear amplifier and means for impressing signals to be demodulated on the input circuit of said amplifier, means for impressing on the output circuit of said amplifier oscillations having exactly the frequency of said incoming signals, said means comprising a generator of local oscillation, means for combining local oscillations with incoming signals, means for combining the beat thereby produced with said local oscillations to produce local oscillations of exactly signal frequency.

18. A signal receiving system comprising in combination a thermionic amplifier having an input and output circuit, arranged to operate as a rectilinear amplifier means for impressing signals to be demodulated upon the input circuit of said amplifier, means for generating local oscillations having approximately the frequency of incoming signals, means for producing a polyphase beat between said locally generated oscillations and said incoming signal frequency, means for combining said polyphase beat with said locally generated oscillations to produce oscillations of exactly signal frequency, and means for impressing on said amplifier said locally generated oscillations of exactly signal frequency.

19. A signal receiving system comprising in combination a thermionic amplifier having input and output circuit, arranged to operate as a rectilinear amplifier means for impressing on said input circuit signals to be demodulated, means for generating local oscillations having approximately the frequency of said incoming signals, means for producing polyphase current from said locally generated oscillations, means for producing a polyphase beat of a frequency corresponding to the difference in frequency between said locally generated oscillations and said incoming signal, means for combining said polyphase beat and said polyphase local oscillation to produce another series of oscillations, the frequency of which is exactly equal to that of the incoming signal oscillations, and means for impressing said last-named oscillation on said amplifier.

20. A signal receiving system comprising in combination a thermionic amplifier having input and output circuits, arranged to operate as a rectilinear amplifier means for impressing signals to be demodulated upon the input circuit of said amplifier, means for generating a local oscillation having a frequency approximately that of the incoming signal to be demodulated, means comprising a pair of thermionic devices each having anodes, said anodes being operated out of phase and having said local oscillations impressed thereon to produce currents of dephased relation and having a frequency corresponding to the beat frequency between said locally generated oscillations and said incoming frequency, means for combining said out of phase beat so produced with out of phase current of local oscillation frequency to produce a single phase oscillation of exactly incoming signal frequency and means for combining said last oscillation with incoming signals.

LOUIS W. KOLOZSY.